Figure 1:
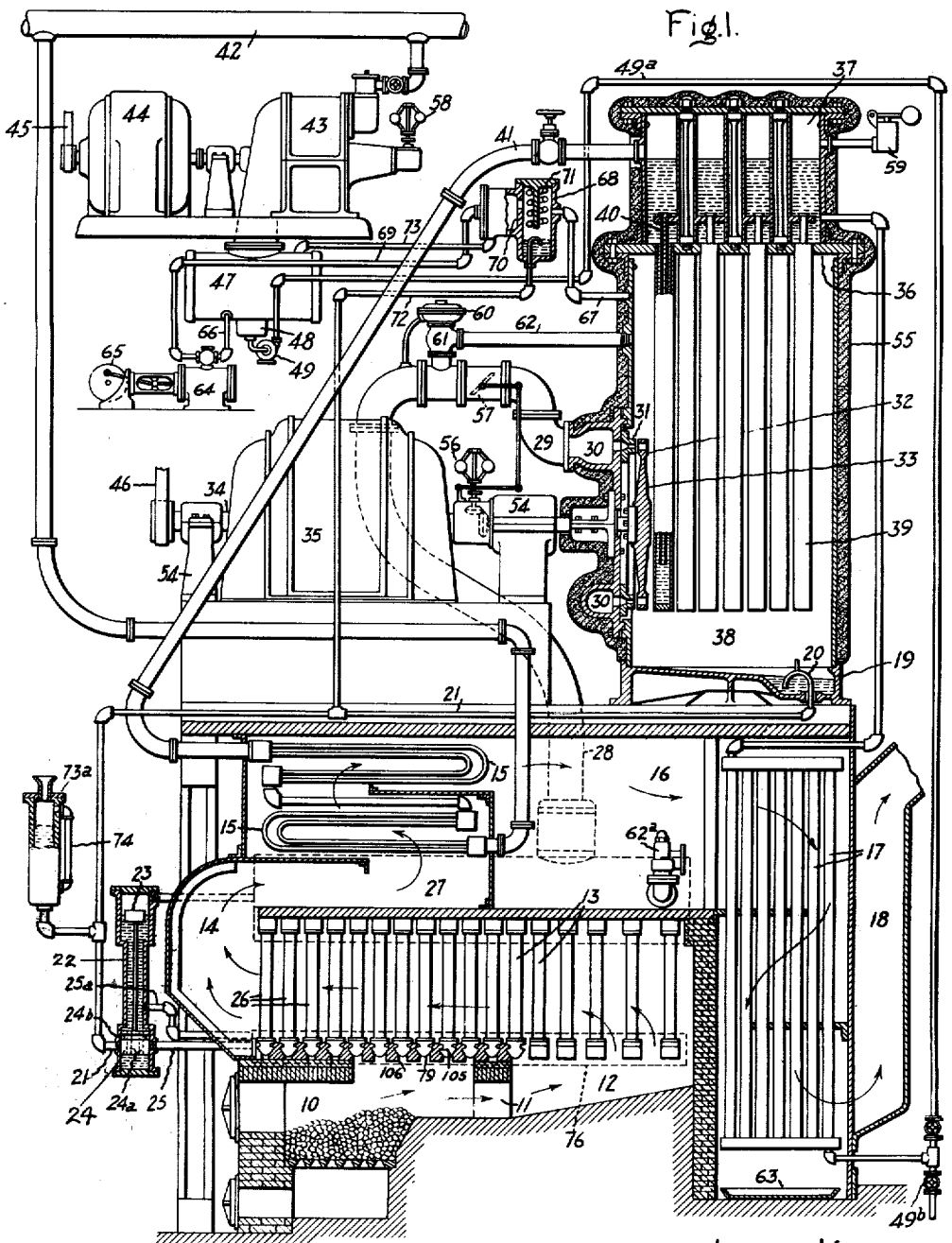

W. L. R. EMMET.
METHOD OF AND APPARATUS FOR GENERATING POWER.
APPLICATION FILED NOV. 29, 1915.

1,167,158.

Patented Jan. 4, 1916.
3 SHEETS—SHEET 1.

Inventor:
William L. R. Emmet,
by Albert G. Davis
His Attorney.

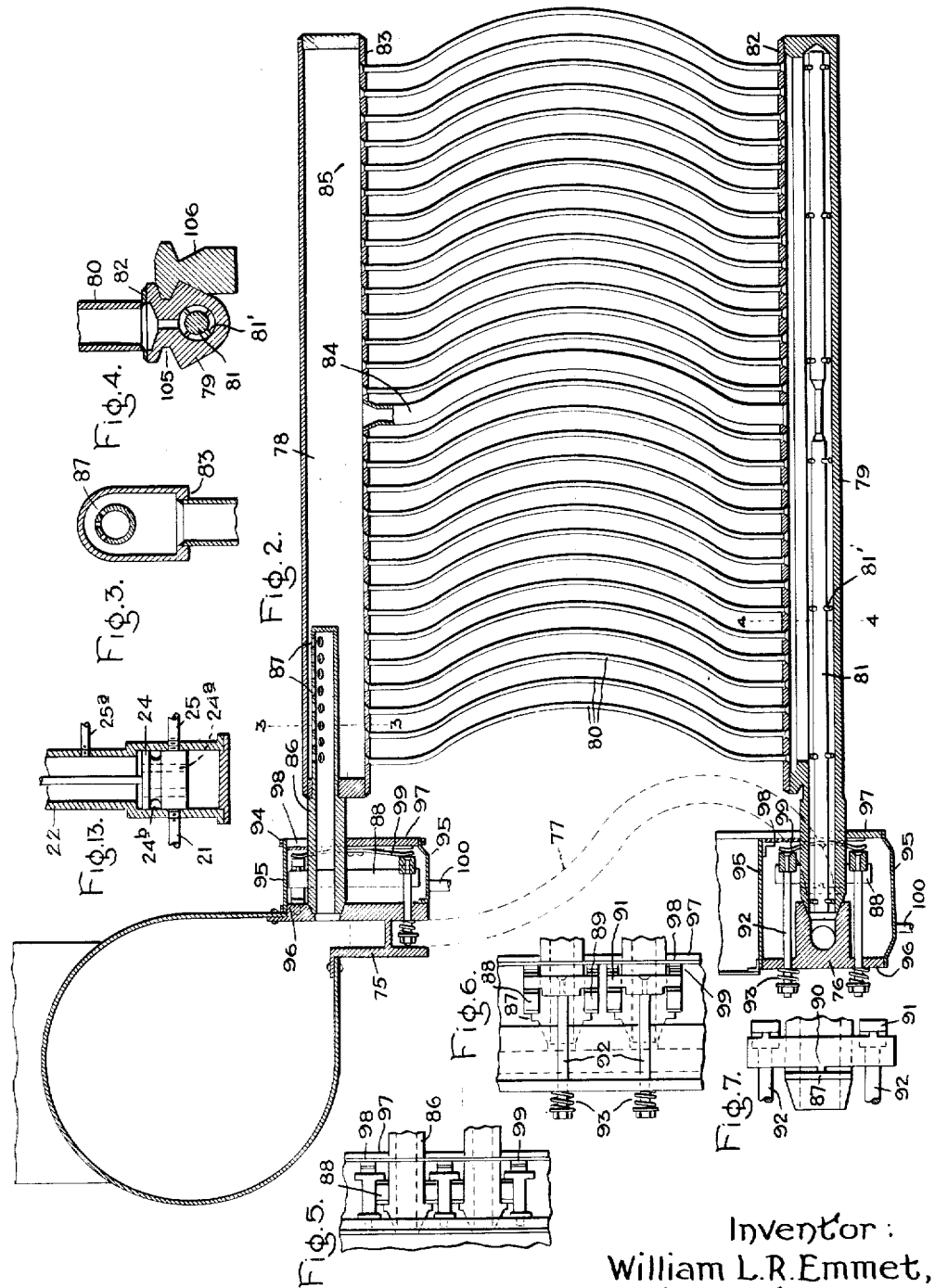

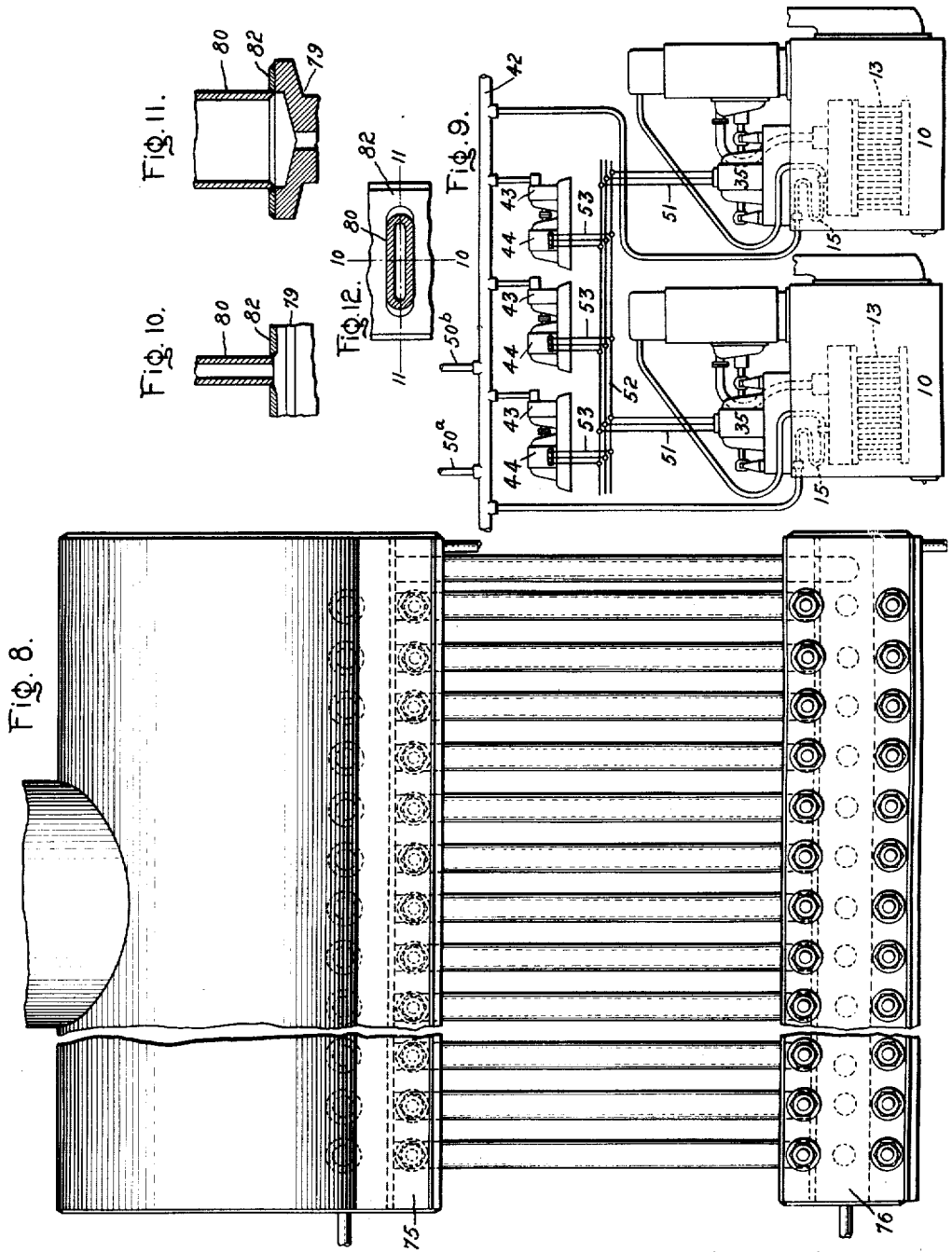

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

METHOD OF AND APPARATUS FOR GENERATING POWER.

1,167,158.      Specification of Letters Patent.      Patented Jan. 4, 1916.

Application filed November 29, 1915. Serial No. 63,992.

*To all whom it may concern:*

Be it known that I, WILLIAM L. R. EMMET, a citizen of the United States, residing at Schenectady, county of Schenectady, State of New York, have invented certain new and useful Improvements in Methods of and Apparatus for Generating Power, of which the following is a specification.

The invention of my present application, which is a continuation in part of my application Serial No. 43,373 filed Aug. 3d, 1915 (which latter is in part a continuation of my prior applications, Serial Nos. 736,322, filed Dec. 12, 1912, and 803,180, filed Nov. 26th, 1913) relates to systems and methods of generating power, and comprises various processes, devices, and arrangements by which the efficiency of such systems may be increased, as will appear more fully below.

By means of my invention I am able to increase the efficiency of power generation by increasing the range of temperature of the working cycle. In ordinary steam processes the lower limit of temperature and pressure, that is to say the temperature and pressure of the steam condenser, is in general rather definitely fixed by the temperature of the cooling-water available, and the upper limit of temperature is in general limited by the difficulty of mechanically handling and confining steam at high pressure and high temperature, which is a much more serious problem than the problem of handling high pressures at comparatively low temperature, or of handling high temperatures at low pressures. I have discovered that it is possible to increase the temperature range of the thermo-dynamic cycle in a practical and highly efficient manner, and to handle commercially the higher temperatures which are involved in such a process, by means of a novel arrangement by which I am able to utilize exceedingly high temperatures and at the same time to restrict the pressure within reasonable limits. I do this by utilizing mercury as a working fluid instead of water, evaporating it in a boiler and securing mercury vapor at a high temperature but at a reasonable pressure, converting a portion of the heat energy of this mercury vapor into mechanical work, as for example by utilizing the mercury vapor to drive a turbine, condensing the mercury vapor and utilizing the heat liberated by the condensation to raise vapor from water or from some other secondary fluid having a relatively low boiling point, and finally utilizing the heat of this secondary fluid, preferably down to as low temperatures as may be available, in the ordinary manner, as for example to operate a steam turbine. The mercury turbine should be so designed that the mercury vapor, in its passage through the turbine, gives up only such an amount of energy as is necessary to reduce the temperature to a point slightly higher than the desired maximum temperature of the secondary fluid, and in general the entire system should be so designed that the heat energy, whether generated by combustion or liberated by condensation, is available for utilization at as nearly as possible its maximum temperature.

My invention includes these and various other features, some of which are auxiliary or incidental thereto and some of which are applicable in other systems of power generation.

Referring to the accompanying drawings, Figure 1 is a diagrammatic view of a power-generating system which constitutes one embodiment of my invention; Fig. 2 is a sectional view of a mercury-vapor generator; Fig. 3 is a detail section substantially on the line 3—3 of Fig. 2; Fig. 4 is a detail section substantially on the line 4—4 of Fig. 2; Figs. 5, 6 and 7 are detail views showing the construction of the casing around the joints of the mercury vapor generator to prevent escape of mercury to atmosphere; Fig. 8 is a view in elevation of the mercury vapor generator; Fig. 9 is a diagrammatic view showing connections and arrangements which may be used; Figs. 10, 11 and 12 are detail views showing the manner of making certain joints in the mercury-vapor system, and Fig. 13 is a detail view of the mercury feed controlling device.

In Fig. 1, 10 indicates a furnace of any suitable construction, which may utilize any desirable kind of fuel. The flue gases resulting from the combustion of the fuel pass through an opening in the brick arch 11 to the chamber 12. From this chamber they pass upward and forward between the tubes 13 to the chamber 14 located at the front of the apparatus. From this chamber the gases make a double pass around the superheater tubes 15, and thence they flow to the chamber 16, from which they make a double pass around the feed water heater tube 17 and emerge into the stack 18. As will appear later, in each of these passages they give up some of their heat, and in each case the heat so given up is utilized at the highest possible temperature, which makes it possible to obtain a high efficiency of utilization. The gases are ultimately reduced to the lowest practicable temperature, and the largest practicable amount of heat is taken out of them and utilized in the most efficient manner.

The mercury to which I have referred above is contained in the receptacle 19 and passes through a vented siphon 20 to the pipe 21, and thence to the feed controlling device 22, the arrangement shown being such that the feed is entirely by gravity.

The feed controlling device 22 is designed to maintain constant the level of the mercury in the boiler and any of the various well known mechanisms for that purpose may be used. I have found that the following construction is satisfactory: A vertical column is provided containing a float 23 which actuates a piston valve 24. This valve, Fig. 13, has a central passage 24ª extending through it to permit mercury to pass from one side to the other, and also an annular channel 24ᵇ which, when it registers with the ends of the pipes 21 and 25, permits fluid to flow from one to the other. To insure the same mercury level in the column that exists in the boiler, a pipe 25ª is provided which connects the column to the fluid space in the preheater and boiler. From the feed controlling device 22 the mercury passes by a pipe 25 into the heating tubes 26 of a mercury preheater or economizer, where it is maintained at a substantially constant level by the action of the valve 24, and flowing through these tubes, is heated by the flue gases passing across them, and then flows into the tubes 13 which constitute the boiler or mercury vapor-generator. From the tubes 13 of the mercury boiler, in a manner to be more minutely described hereafter, the vapors of the mercury pass into the header 27, (shown in dotted lines) and then through the pipe 28 to the admission pipe 29 of a mercury vapor turbine, and thence, through the annular chest 30 and the nozzle 31, to the buckets 32 of the turbine wheel 33. The mercury vapor in passing through and issuing from the nozzles 31 is expanded by lowering its pressure, just as steam is expanded in a steam turbine, and this expansion involves a partial conversion of the heat energy into velocity energy. This results in an impingement of a blast of mercury vapor upon the buckets 32, and tends to drive the wheel 33, and this wheel may drive the shaft 34 of an electric generator 35. The mercury vapor, expanded in the mercury turbine and therefore to a certain extent cooled, then impinges upon the tubes 39 of a condenser boiler and is condensed, the liquefied mercury flowing into the collecting device or sump 19, there to be picked up by the vented siphon 20 and fed again, through the pipe 21, to the mercury preheater and boiler.

The condenser boiler comprises a well lagged receptacle divided by a tube sheet or partition 36 into two chambers 37 and 38. The chamber 37 contains the secondary fluid, which for the purposes of this discussion will be assumed to be water, though various other fluids may be used. Each of the tubes 39 is fastened into the tube sheet 36, and inside of each of the tubes 39 is another tube 40 arranged concentrically therewith. The mercury vapor flows around the tubes 39, heating them, and this heat is communicated to the water in the annular space between the tubes 39 and the tube 40, whereby the water is heated and boiled, and tends to rise, and its place is filled by water flowing down inside of the central tube 40. It will be seen that this arrangement of the condenser boiler results in a structure which has great freedom from stresses due to unequal expansion, which might tend to loosen the joints, that the delivery of heat to all parts of the surface is very uniform, and that the construction affords ample opportunity for the circulation of water and the generation of steam. This arrangement also makes it possible to remove or clean the tubes by working from the top of the condenser boiler, which for that reason can be placed directly on or close to the foundation or floor, or, as I prefer, can be supported on top of the furnace. I find it best to support the condenser boiler with its central axis substantially in line with the axis of the mercury turbine, which makes it easier, over a wide range of temperature, to preserve the tightness of the joints at the packing where the turbine shaft passes into the condenser boiler.

The steam generated in the condenser boiler flows out at the top through the pipe 41 to the steam header or pipe 42, from which it may be drawn to be used in any of the various ways in which steam may be utilized. On its passage to this header, if superheat is required, I pass it through the superheater tubes 15. In passing through these tubes it is superheated by the action of the flue gases, which, as above explained, cross them.

As typical of one way in which the steam produced by the condenser boiler may be used, I have shown in Fig. 1, as a steam utilizing device, a steam turbine 43, which may be of the well known Curtis type, fed with steam from the header 42. This turbine is shown as driving an electric generator 44. I have indicated by the pulleys and belts 45, 46 that either or both of the shafts on which the turbines are mounted may drive some external device, or generally may do mechanical work in any preferred way, but even when all of the energy of each turbine is utilized for non-electrical purposes I may still place on their shafts the electric generators, as the presence of these generators makes it possible for the total power developed by the two machines to be applied to the devices to which they deliver power in any ratio required, since in such an arrangement, if the terminals of the two generators are connected in multiple the generator attached to the machine which is overloaded will act as a motor, taking power from the generator attached to the machine which is underloaded. The steam flowing through the steam turbine 43 is, in this particular system shown for illustration, passed to the steam condenser 47, which may be of any ordinary type, and from this condenser the water condensed from the steam passes to the hot well 48, from which it is discharged by a pump 49 through the pipes 49$^a$ and through the tubes 17, which form a feed water heater, and thence to the condenser boiler, to be again turned into steam and utilized. Make up water is admitted as needed through the valve 49$^b$.

Referring to Fig. 9, the general arrangement and layout of my system will be more readily apparent. In this figure it appears that each furnace 10 containing its mercury boiler 13 and superheater 15, etc., may be equipped with a mercury turbine, and a corresponding condenser boiler. The steam furnished by the condenser boiler passes to the heater or steam main 42, from which it may be taken for any uses desired, as for example to feed a number of steam turbines 43, or through the pipes 50$^a$, 50$^b$ may be taken off and utilized in any of the various ways in which steam may be made useful. The current from the generators 35 is led through the wires 51 to the electrical bus bars 52, and to these same bus bars are led, through the wires 53, the currents from the generators 44.

The high vapor density of mercury and the fact that even at very high temperatures the pressure of its vapor is low, make it possible to use a mercury turbine of very simple design, and indeed the turbine need, as shown in Fig. 1, contain only a single wheel 33. The wheel is shown as provided with a socket in the center, into which is bolted a head on the right-hand end of the shaft 34, which shaft turns in the bearing 54. This construction not only avoids the necessity of boring an axial hole in the turbine wheel, which would greatly weaken the wheel, but also makes it possible to use a very simple overhung construction and to combine the turbine and condenser boiler in a single structure, which not only saves expense but minimizes radiation and exhaust passage losses. To further minimize radiation, the condenser boiler is entirely surrounded by heavy lagging 55.

At 56 is indicated a centrifugal governor for controlling the speed of the mercury turbine. This governor acts upon some regulating or governing device, as the valve 57, which may, as shown, be a simple throttle valve. The steam turbine is provided with a similar centrifugal governor 58 which acts on suitable governing devices, which may be of the well known hydraulic type and are so well known that further description of them will be unnecessary. I desire, however, to call particular attention to the setting of the governors 56 and 58. These governors are adjusted so that the governor 56 tends to maintain the mercury turbine at a slightly higher speed than that at which the governor 58 tends to maintain the steam turbine. But the two machines are held at the same speed by the electrical connections, and the result is a tendency to throw on the mercury turbine a higher load in proportion to its capacity than is thrown on the steam turbine, and to allow the mercury turbine to run at full load as far as possible, the fluctuations of load being taken principally by the steam turbine. The result of this is that in the operation of the system the mercury turbine will tend to take from the fire the maximum possible quantity of heat energy, to utilize that heat energy, in so far as it can do so, and to deliver the rejected heat energy to the steam system. The quantity of heat energy which can economically be stored in the mercury boiler is relatively small since mercury is an expensive substance, and it is only by an arrangement whereby only a small quantity is required that I am able to develop my system in such a way that it can be used commercially in any ordinary case. I cannot therefore rely on storing any great quantity of heat energy in the mercury boiler, but the quantity of water in the condenser boiler, and its corresponding heat storage capacity, may be as large as is desired. If for example the load on the system should fall off, the mercury turbine would tend to take a larger share of the load and would tend to take heat from the fire perhaps almost as rapidly as before, but this heat, except what was utilized in making power, would be delivered to the condenser boiler and there stored, and this operation would continue for a reasonable time until the rate of consumption of fuel in the fire could be reduced. With an increase of load, the opposite condition would occur, that is, the system could be run on an overload carried for a time largely on the heat furnished by the steam boiler.

I may regard this whole system, from the mercury boiler to the condenser boiler, as a device for transferring heat energy from the fire to the steam, extracting and efficiently utilizing a portion of that energy on the way. From this point of view it is desirable that the governing device should be such as to allow this transfer process to proceed with the utmost freedom, and of course any excess of pressure thus created in the steam is taken care of by a safety valve 59 in the usual way. Nevertheless under certain circumstances heat energy will be supplied to the mercury faster than it can be utilized, and the pressure will tend to rise unduly. When this happens, the pressure actuates a diaphragm 60 which opens a by-pass valve 61, and on the opening of this valve, which is practically an ordinary safety valve in its construction, the surplus mercury vapor can be vented directly into the condenser boiler through the pipe 62. It will be obvious that by this arrangement no heat energy and no mercury is wasted, but that the heat energy becomes available at a lower temperature, that is, at the temperature of the steam rather than the temperature of the mercury vapor, and this lower temperature heat energy can only be converted into power at lower efficiency, so that there is some practical loss of energy in this operation, and it is desirable that it should occur as seldom as may be, in other words that the mercury turbine should always take as much of the load as it can conveniently carry. I accomplish this result, as stated above, by setting the governor of the mercury turbine for a slightly higher speed than that for which I set the governor of the steam turbine.

The safety arrangement above described assumes the existence of a proper amount of water in the condenser boiler for condensing any mercury which may be vented into it, as well as the integrity and proper functioning of the valve 61. To take care of failure of either of these conditions, I provide an additional safety valve 62ᵃ connected to the collecting space of the mercury boiler, to be described in detail hereinafter, and so arranged that any mercury vapor vented at this point will be carried with the flue gases across the tubes of the feed water heater, and thus will tend to be condensed and to fall into a receptacle 63 placed below, from which it may be removed from time to time. The vapor will condense in this region because the temperature of the flue gases has been greatly reduced by their action on the various devices in their path.

While for purposes of illustration I have shown in Fig. 1 only one fire box and one mercury turbine and condenser boiler, it is my intention, in the ordinary case, to replace each of the steam boilers in an ordinary steam generating plant with one of these units consisting of one of each of these devices, and all of the units may feed steam into the same header, as shown in Fig. 9. As the load or demand for steam increases or decreases another of these units will be cut in or out, just as is now done with respect to individual boilers in steam practice.

In order to maintain a high vacuum in the steam condenser 47 and in the mercury condensing chamber 38 of the condenser boiler, I may provide a single air pump 64 actuated by an engine or a motor 65, and pipe both of these condensing means to this air pump, the steam condenser 47 through the pipe 66 and the mercury condensing chamber 38 through the pipe 67, the cooler 68 and the pipe 69. The two chambers of the cooler are separated by a partition 70 in which an opening is located, as shown, and inside of the cooler is a coil of pipe 71, through which water or other cooling fluid can be circulated. The mercury condensed in the cooler drops to the bottom and is fed back to the mercury system through a siphon and the pipe 72. The pipe 73 serves to return to the steam condenser 47 any water accumulating in the cooler.

In addition to the supply of liquid mercury contained in the sump 19, I provide a reserve supply in the reservoir 73ᵃ, which is provided with a gage-glass 74, arranged to indicate the level of the mercury which it contains. This reservoir is piped into the liquid mercury system at any preferred point. If the reservoir is open at the top to the atmosphere, which is the most convenient arrangement, it must be so located with respect to the sump 19 that the level of the mercury in the reservoir and that in the sump will correspond, allowance being made for the fact that there is a vacuum in the sump and not in the reservoir, that is, the reservoir will be so located that the level of the mercury surface therein can be about 30 inches below the level of the mercury in the sump. At the same time the reservoir should be high enough so that it does not tend to drain mercury from the mercury boiler or the controlling device therefor. To state the matter in another way, the reservoir should be below the sump and sufficiently above the feed pipe 25 that said reservoir can feed mercury to the preheater or economizer and boiler when necessary. This reservoir as arranged is useful not only as a means for providing a surplus supply of mercury for the system and for conveniently renewing that supply, but also as affording an indication of any leakage or loss of mercury. A slight leakage from one of the tubes of the mercury boiler, for example, might not be noticed in the normal operation of the plant until a large quantity of mercury had been lost, but such leakage will not proceed very far before it may be noticed by the dropping of the level in the gage-glass attached to the reservoir, which indication justifies the shutting down of that particular unit and an investigation to discover the source of the leakage.

Owing to the high boiling point of mercury and its initial cost and weight for a given bulk, the problems presented in the design of the mercury boiler for my improved system are radically different from those confronting the constructor of a steam generator. One of the principal problems is that of securing the tubes to the headers. I have found that the ordinary expanded joints are not suitable for the reason that they tend to loosen through unequal expansion due to large temperature differences. In some cases the stresses due to such expansion are so great as to exceed the elastic limit of the metal employed in certain parts. The high initial cost of mercury and its great weight for a given bulk require a construction wherein the storage space is small, to allow the use of a small quantity of mercury per unit of output. Reducing the quantity of mercury, however, necessitates a very active circulation of the liquid, since otherwise the output would either be greatly impaired or the tubes damaged by the high temperature of the furnace gases. Still another problem is to conserve the leakage from around the various joints and return it to the system for further use. Finally, the generator should be so constructed that it can be readily assembled and taken down.

Located at some suitable point outside the brick casing of the generator, as at one side for example, are two chests 75 and 76, Figs. 2 and 8, the former containing mercury vapor and the latter mercury in liquid form. The chest 76 receives liquid mercury from the economizer. The upper part of the chest 75 is enlarged to form a vapor containing chamber, which is common to all of the boiler sections or heating units, from which chamber vapor passes to the turbine by the pipe 28, shown largely in dotted lines in Fig. 1. The upper and lower chests may be connected by the conduit 77, Fig. 2, shown in dotted lines, through which liquid mercury can flow from one to the other. This conduit also is located outside of the boiler casing, to reduce the effects of expansion and contraction. The various parts external to the casing will commonly be covered by heat insulating material, to prevent undue radiation. The liquid mercury discharged from the condenser boiler flows by the pipe 21, Fig. 1, to the economizer or preheater and thence to the lower chest 76, and its admission to the economizer is controlled by the valve 24 as heretofore described. This valve is contained in the vessel 22, which is also located outside of the generator. This arrangement maintains a substantially constant liquid head on the generator at all times.

The mercury boiler comprises a plurality of replaceable heating units which are best shown in Fig. 2. Each unit comprises an upper header 78 and a lower header 79, with their connecting tubes 80. Each of the lower headers 79 is in communication with the lower chest 76 and each of the upper headers 78 is in communication similarly with the upper chest 75. The lower header contains a filler 81 comprising a cylinder of metal which is maintained in position by radial spacers 81'. This arrangement is shown more clearly in Fig. 4. The purpose of the filler is to reduce the cubical contents of the header 79 and thus reduce the amount of mercury which it is necessary to provide in the boiler. This header is provided with a crown sheet 82 into which the boiler tubes 80 are welded by acetylene welding or by other means. The tubes 80 are flattened out as shown in Fig. 12, in order to limit the amount of mercury contained in them and to facilitate the transfer of heat to the mercury. These tubes are preferably made of seamless steel which is not affected by mercury. The details of the weld between the crown sheet and the tube are shown in Figs. 10 and 11. Fig. 11 shows the external weld and Fig. 10 the internal weld. Fig. 10 is a section on the line 10—10 of Fig. 12, and Fig. 11 is a section on the line 11—11 of Fig. 12.

The tubes 80 are bent as shown in order to reduce the evil effects of expansion and contraction, and at the upper end enter the crown sheet 83 of the header 78 to which they are welded in the same manner as that above described.

In addition to the regular tubes 80, I provide a special return tube 84 which is similar to the tubes 80 except that it is of larger cross-section, and I allow the mercury in the upper header to flow down through this tube to the lower header, while the mercury in the smaller tubes is being forced upward by the action of the fire. By the use of this return tube 84 I render it unnecessary except in certain cases to use the outside return tube 77 above described.

The dotted line 85 in Fig. 2 shows approximately the level at which the mercury should be maintained by the action of the regulating device 22, 23, 24. The mercury vapor passing up through the tubes 80 collects above the dotted line 85. The tube 86 connecting the header 78 with the upper chest 75 is extended into the header 78 and is provided with openings 87 which are located on the upper portion of the tube, to minimize the tendency of the mercury to be entrained with the mercury vapor and carried over into the chest 75.

It is important to make a tight joint between each of the headers and its chest to prevent the escape of mercury or mercury vapor. To accomplish this, the tube 86 is tapered at one end and snugly fitted into a correspondingly tapered opening or seat in a wall of the chest. The tube where it extends outside of the header is made square and on opposite sides and extending vertically are shoulders 87, Figs. 5 to 7, with which engage bars 88 and 89. On each bar is a small lug or projection 90 that engages a shoulder substantially in line with the axis of the tube to insure an even pressure for forcing the conical end against its seat. Engaging with each pair of bars is a pair of cross members 91 through which pass retaining bolts 92. Between the adjusting nuts on the bolts and a wall of the chest are stiff coiled compression springs 93. This arrangement permits of expansion and contraction of the parts due to temperature changes. As will be seen the same arrangement is used for securing both the top and bottom headers to the chests.

To further assist in conserving the supply of mercury, boxes or casings, which are connected to a cooler for condensing the vapor, are provided for the various joints. 94, Fig. 2, indicates one of these boxes which surrounds the joints between the vapor chest 75 and the tubes 86 leading from the upper header 78. The box may be made in a variety of ways, but is here shown as comprising top and bottom walls 95 that are secured by welding or brazing to a flange 96 on the chest, said flange and chest forming one side of the box. The remaining side of the box is formed of two plates 97 and 98, each being provided with as many vertically extending and square-ended openings or slots as there are tubes 86. The two plates when assembled in position engage the tubes on the sides and also from above and below, the lower plate covering the slots in the upper plate below the tubes and the upper plate covering the slots in the lower plate above the tubes. The lower plate which is also on the outside is secured to the top and bottom walls by bolts, and the inner or upper plate is pressed against the outer plate by flat springs 99. Each box is provided with a drainage pipe 100 which is connected to a suitable cooler as 68, Fig. 1, for example, from which mercury is returned to the system. As before stated, the cooler is subjected to the action of the vacuum pump 64 so that any mercury vapor leaking out of the joints will be drawn into the cooler and condensed. These boxes or closures can be considered as typical of such devices for other joints in the system. The construction of the mercury economizer and the tubes 26 thereof is the same in all substantial respects as that of the vapor generator tubes, and further description on this point seems unnecessary.

The headers 79 are provided on their sides with grooves or channels 105, Figs. 1 and 4, to receive the blocks 106, which serve as means for preventing the fire gases from passing directly between the tubes, and cause them to pass first into the chamber 12 and then through the tubes as described more particularly in connection with Fig. 1. The blocks 106 may, as shown, be omitted from the lower ends of the tubes on the extreme right to facilitate the passage of the flue gases and to prevent them from concentrating their effect on the outer row, it being remembered that the radiation from the brick work at this point is intense.

I have described certain arrangements for utilizing the heat remaining in the flue gases after they have passed across the tubes of the mercury generator or boiler, to assist in the production of secondary vapor, but these may be modified, depending upon the particular requirements of a given installation. In some cases the flue gases will serve only for heating the liquid, and in other cases they will serve both for heating and for partially vaporizing the liquid. If the liquid to be delivered to the condenser boiler is cold they will generally serve only to heat the same, but if the liquid is hot they will usually serve to generate vapor, as well as to add heat thereto. The principal thing is to utilize as completely as possible and at the highest possible temperature the heat remaining in the flue gases.

Comparing my power generating system with an ordinary steam plant, it will be seen that by replacing the boiler of the steam plant by a mercury generator, a mercury turbine, and condenser boiler, and by slightly increasing the amount of fuel burned in the furnace, all of the heat which in the old process was delivered directly to the steam is delivered to the mercury, and in addition there is delivered to the mercury the amount of heat corresponding to the extra fuel. The first amount of heat above mentioned is, by means of the condenser boiler, ultimately delivered to the steam, and in its transmission very little loss is involved, and the additional heat is utilized in the mercury turbine, at practically 100% efficiency; it is necessary to add only that amount of fuel corresponding to the amount of heat energy actually extracted and turned into work in the mercury turbine, since even the losses due to the inefficiency of the mercury turbine appear as heat in the mercury vapor, and are delivered, with only a very small loss, to the steam. But after the high-temperature heat energy has been extracted from the flue gases, by passing them across the tubes of the mercury boiler, there still remains in these gases a large amount of heat energy which, though at lower temperature, is still too valuable to be wasted. I have shown how the energy corresponding to the higher portion of the temperature range can be utilized efficiently in a mercury turbine. The next lower range cannot be so utilized, but should still be utilized at the highest possible temperature, and is best utilized to heat the liquid mercury and to raise it to or near its boiling point. The next range of temperature of the flue gases, which have now been brought below the point at which they can be utilized to heat the mercury, can in most cases be most efficiently utilized for superheating the steam as shown in Fig. 1. The steam superheater should reduce the gases to a temperature of 500° or 600° F. This leaves 200° or 300° of heat which, although at a very low temperature, can still be extracted by the feed water heater 17. I am thus able to utilize, in a different manner, each of the successive ranges of temperature resulting from the extraction of the heat energy of the flue gases, and each in the manner in which its utilization can be effected with the greatest efficiency.

I am aware that various suggestions have been made in the past for compound or complex heat engine processes in which two fluids have been used, one after the other, but hitherto no fluid has been found available technically or commercially to be used in the first stage of such a compound process. I have found that mercury is highly adapted for this purpose when used as I have directed. Its boiling point is high compared to that of water, and the pressure at which it vaporizes is low enough so that it can conveniently be handled by ordinary methods; its heat conductivity is high, which makes possible a high rate of delivery from the tube walls of the boiler to the liquid; it does not dissociate at high temperatures; its vapor density is high and its spouting velocity in the turbine is low, which makes it possible to utilize a very simple type of turbine; it carries nothing in solution which can adhere to or affect the heating surface, which makes it possible to keep the interior of the boiler always clean; it does not "wet" the surface of turbine blades, and, therefore, has little tendency to cut or erode them; at the temperatures used it is completely neutral to air, water, iron, and such substances as it may come in contact with; and its high specific gravity makes possible certain very convenient mechanical expendients which I have devised, as for example, the use of gravity feed to the boiler, the sealing of valve-stems, etc., by gravity, centrifugal sealing of the shaft packing, etc.; and the volume of its vapor at convenient condensing temperatures is much less than that of water, so that it can be used in a turbine without the necessity of the enormous buckets which are required in the low-pressure end of a steam turbine. And, finally, its properties are such that it can, in a very efficient and simple condenser, give up its heat to the secondary fluid.

Obvious objections to the use of mercury are its high cost and the poisonous nature of its vapor. The high cost is objectionable from two points of view: First, although the mercury is condensed and can be used over and over again, nevertheless the quantity which is necessary to be used in a boiler of ordinary construction is so great that the initial investment would be prohibitive; second, any mercury which leaks out of the system either as liquid or as vapor is lost and must be made up, which adds to the operating expenses. I have been able to overcome these difficulties, as above shown, by the invention of a special boiler adapted to contain only a small quantity of mercury, and by devising various means for preventing the escape of the mercury from the system.

In the practice of my invention I have at the present time found it most convenient to use water as the secondary fluid, and to arrange the division of temperatures between the mercury and water turbines in such a way as to generate the steam for the water or steam turbine, or, generally, to generate the steam, for whatever purpose it is utilized, at about the standard pressures and temperatures which are now in use in the best steam practice, so that my mercury turbine and its accessory apparatus can be supplied to existing stations without modification of the steam apparatus. It will, however, be obvious to those skilled in the art that the exact division of energy between the two systems is a matter of choice and convenience.

Under the conditions of operation above described, the pressure of mercury vapor entering the primary prime mover will be low, say 25 to 30 pounds absolute, though my invention is in no wise limited in this respect. The use of a rather low pressure reduces the danger of leakage, and it is quite possible to hold the mercury entirely below atmospheric pressure, that is, to generate merely a pressure of, say, 14 to 14½ pounds per square inch absolute, in which case there will be no tendency of the mercury vapor to leak out from the system, but, rather, the tendency will be to draw in air through any leak which exists.

The boiling point of mercury at 28 inches vacuum being 457° F., by condensing the mercury at this vacuum it is possible to generate steam at about the highest pressures which are commercially used. A somewhat higher vacuum in the mercury condenser of course results in the utilization of more of the heat in the first part of the cycle, leaving a lower temperature available for the secondary process.

The utilization of my invention in existing steam plants, therefore, requires only the substitution for the ordinary steam boiler of the mercury boiler and its accessories and a condenser boiler, the steam turbine and its condenser and accessories remaining the same. The space occupied by the new apparatus will not greatly differ from the space occupied by an ordinary steam boiler which uses the same quantity of fuel. The primary prime mover will generally, but not necessarily, be arranged to drive a load in common with the secondary prime mover.

The advantages of my improved system may be illustrated by a calculation which I have made on certain assumptions which seem to me to be reasonable, that by the addition of my device to an assumed good modern power station, and with an increase of 15% of the amount of fuel which is used, the same amount of steam can be supplied to the steam turbines as under present conditions, and the mercury turbines will generate power equal to about 66% of the power generated by the steam turbines. This results in a gain in station capacity of approximately 66%, and this without any increase of floor space, and further results in a gain of efficiency such that the amount of energy developed per pound of fuel is about 144% of that of the same station without the addition. This is based on the use of mercury vapor ten pounds above atmospheric pressure, or 24.5 pounds absolute, and on condensing the secondary fluid, in this case water, at a vacuum of about 28.5 inches at the steam turbine outlet, with an evaporation of about 10 pounds of mercury for each pound of steam produced, a steam pressure of 175 pounds gage, 150° superheat, and a final fuel gas temperature of about 300° F. The vapor velocity of the mercury turbine is about 1200 feet per second, and the turbine therefore requires only one bucket wheel and may be of a very simple construction.

My invention can be applied to existing non-condensing steam plants as well as to those in which the steam is condensed, and in such cases it is obvious that the gain in efficiency is very much higher than would result in the case of the addition of my invention to a condensing plant. So also the case which I have chosen for illustration is one in which the steam plant is modern and of a high quality. In the case of inferior stations the results will be more striking. In any case where steam is generated the invention can be applied and, with only a small increase of the amount of fuel consumed, the same amount of steam now developed can be produced, and a large amount of power developed by the mercury turbine can be obtained as a by-product.

In comparing my system with an ordinary steam system, it will be seen that I raise the temperature of the working fluid, the mercury, by imparting to it an amount of energy somewhat greater than that which would be imparted to the steam, and by means of the mercury vapor deliver to the steam, less the radiation and conduction losses, all of this energy except that which has actually been efficiently utilized in the mercury turbine. The heat imparted to the steam is utilized at the efficiency characteristic of the steam process, since the steam turbine functions just as it always did, and the extra heat imparted, the heat in the mercury boiler which is not delivered to the condenser boiler, is all utilized in the mercury turbine, so that while of course the over-all efficiency of the plant must follow Carnot's law, it is fair to say that the efficiency of the mercury turbine, regarded as an adjunct to a steam plant, is substantially 100 per cent., since it converts into mechanical power substantially all of the extra heat imparted to the mercury over that which it would be necessary to impart to the steam if the steam plant alone were to be run. The mere existence of losses in the mercury turbine is not inconsistent with the statement I have just made, because such losses in general, excepting of course the negligible heat losses due to radiation and conduction, are not true losses of energy, but mere failures to convert energy, and the energy corresponding to these losses appears as additional heat in the mercury vapor, and is of course available for utilization, though at a lower temperature, in the condenser boiler.

In my system the mercury vapor acts as a conveyer of heat from the fire to the secondary fluid, and any failure to use this heat in the mercury vapor turbine results in the delivery of a greater amount of heat to the boiler, and hence in a greater production of secondary vapor. The higher the efficiency of the mercury vapor turbine and the greater the range of temperature utilized therein, the less in general will be the amount of heat available for the production of secondary vapor, and vice versa.

The description of my invention has been directed in large part to a system where the steam is utilized in a steam turbine, but it may be used for any desired purpose, the uses to which steam is put being so numerous and well known as to render it unnecessary to specifically mention them.

I have described the construction and operation of one form of my improved mercury vapor generator herein, but do not claim it specifically because it forms the subject matter of my application for Letters Patent Serial No. 803,178, filed November 26, 1913.

The arrangement of the mercury vapor turbine within the condenser boiler is not specifically claimed herein because it forms the subject matter of my application for Letters Patent Serial No. 803,179, filed November 26, 1913.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The process of generating power which consists in transmitting heat from a source to mercury and producing mercury vapor at a high temperature, converting a portion of the heat energy in this mercury vapor into mechanical work, condensing the vapor and transferring its remaining heat of vaporization and its latent heat of condensation to a secondary fluid, and utilizing the heat energy in this vapor so generated to produce mechanical work.

2. The process of deriving mechanical energy from a source of heat, which consists in delivering high temperature heat energy from such source to mercury, and vaporizing the same, working the resulting mercury vapor in a heat engine, extracting residual heat energy from mercury vapor at a lower temperature and utilizing the same, and extracting residual heat energy from the said source and utilizing the same.

3. The process which consists in generating gases at high temperature, transmitting heat from said gases to mercury and vaporizing the same, extracting mechanical work from the vapor, condensing the vapor and utilizing the heat of condensation for the production of vapor in a secondary system at a lower temperature, utilizing such lower temperature vapor for the production of mechanical work, extracting residual heat from said gases and utilizing the same in successive steps at increasingly lower temperature, first for heating the mercury before vaporization, and second, for adding to the heat in the secondary system.

4. The process of utilizing the heat of combustion to generate power, which consists in causing the high temperature gases resulting from said combustion to vaporize mercury at low pressure, converting a portion of the heat energy of such vapor into mechanical energy in a fluid engine, discharging the mercury vapor from said fluid engine into a closed chamber having a vacuum maintained therein, utilizing the heat energy of said exhaust vapor to vaporize a fluid of lower boiling point at a materially higher pressure, and thereafter utilizing said latter vapor to generate further mechanical power in a fluid engine.

5. The process of delivering energy to an electric system, which consists in generating high temperature gases by combustion, transferring heat from said gases to a fluid having a higher boiling point than water, converting a portion of the heat energy of such fluid into mechanical energy, utilizing the latent heat of vaporization of the fluid after said conversion into mechanical energy takes place to generate vapor of a secondary fluid of lower boiling point, utilizing a portion of the heat energy of said secondary fluid to generate further mechanical power, converting the mechanical power resulting from these steps into electrical energy and delivering the electrical energy resulting from both steps to the said electric system.

6. The process of utilizing heat from a source which consists in delivering the high temperature portion of such heat to a fluid having a boiling point higher than water and producing vapor from the same, delivering heat energy from such source at lower, but still high, temperature to preheat the same fluid before vaporization, converting a portion of the heat energy of such vapor into mechanical work, utilizing a further portion of the heat energy of such vapor to generate a secondary vapor from a substance of lower boiling point than the substance of which the first vapor was composed, and utilizing further portions of the heat of the original source for adding to the heat energy of the secondary fluid.

7. The process of utilizing the heat of combustion to generate power which consists in causing the high temperature gases resulting from said combustion to first vaporize a fluid of high boiling point at low pressure, then to preheat said fluid, then to superheat vapor generated from a second fluid of lower boiling point, and finally to preheat said fluid of lower boiling point, thereby utilizing the heat of the gases generated by combustion throughout the entire process at substantially the highest temperature at which they are capable of being utilized.

8. The method of operating a primary and a secondary heat engine, which consists in generating vapor for the secondary heat engine from heat rejected by the primary, and governing the two heat engines by opening the supply valve of the primary heat engine in advance of that of the secondary engine so that said primary engine tends to take an increased load before it is taken by the secondary engine.

9. In a power generating system, the combination of a vapor generator containing mercury, a prime mover arranged to receive the mercury vapor and convert a portion of its energy into mechanical work, and means for condensing the mercury vapor and utilizing heat therein contained to produce a secondary vapor in a form available for use.

10. In a power generating system, the combination of means containing mercury for generating vapor, a prime mover arranged to receive the vapor and convert a portion of its energy into mechanical work, means for condensing the vapor exhausting from the prime mover, means for utilizing heat remaining in the mercury vapor to raise steam from water, and means for utilizing the steam so generated.

11. In a power generating system, the combination of means containing mercury for generating vapor, a prime mover arranged to receive the vapor and convert a portion of its energy into mechanical work, means for condensing the vapor exhausted from the prime mover, and means for utilizing its latent heat of condensation to generate a vapor from a secondary fluid, and a primary mover arranged to derive mechanical power from the secondary fluid so generated.

12. In a power generating system, the combination of a vapor generator containing mercury, an engine arranged to receive the vapor therefrom and extract a portion of its energy, means for condensing the exhaust from the engine and returning the liquid mercury to the generator, and means for utilizing heat contained in the mercury vapor for generating a high pressure elastic fluid.

13. In a power generating system, the combination of a vapor generator containing mercury, an engine arranged to receive the vapor and convert a portion of its energy into mechanical work, a condenser-boiler which receives the exhaust mercury vapor from the turbine and utilizes heat contained in said exhaust to produce a secondary vapor in a form available for use from a fluid having a lower boiling point than mercury, a turbine arranged to receive said vapor and convert a portion of its energy into mechanical work, and a condenser for the exhaust of the second turbine.

14. In a power generating system, the combination of a vapor generator containing mercury, a turbine arranged to receive the vapor and convert a portion of its energy into mechanical work, a condenser-boiler which receives the exhaust mercury vapor from the turbine and utilizes heat contained therein to generate a secondary vapor from a fluid having a lower boiling point than mercury, means for returning the liquid mercury from the condenser-boiler to the generator, a turbine means arranged to receive said secondary vapor and convert a portion of its energy into mechanical work, and a condenser for the second turbine.

15. In a power generating system, the combination of means containing mercury for generating relatively low pressure mercury vapor, a prime mover arranged to receive the vapor and convert a portion of its energy into mechanical work, means receiving and condensing the vapor exhausting from the prime mover and utilizing its heat to generate a secondary vapor at a pressure higher than that of the mercury vapor, and means receiving and utilizing the secondary vapor.

16. In a power generating system, the combination of a generator for high temperature vapor which has a relatively limited storage capacity for liquid per unit of output, a prime mover for utilizing the vapor, a condenser-boiler for condensing the vapor from the prime mover and generating a vapor from a liquid of lower boiling point, and a second prime mover for utilizing the vapor produced by the condenser-boiler, the boiler portion of said condenser-boiler having a greater storage capacity for liquid per unit of output than that of the high temperature vapor generator.

17. In a power generating system, the combination of a mercury vapor generator, a turbine and a condenser working on a closed cycle, said generator having a relatively limited capacity for the storage of liquid mercury per unit of output and arranged to have rapid vaporizing capacity, a steam boiler associated with the condenser and receiving its heat therefrom, said boiler having a greater storage capacity for water per unit of output than the mercury vapor generator, and a high pressure condensing turbine which receives and is driven by the steam from the boiler.

18. The combination of a mercury vapor generator with a steam generating means which is partially heated by vapors form the generator and partly by products of combustion from said generator after they have given up heat thereto, and means for extracting work from the mercury vapor prior to its action on the steam generating means.

19. In combination, a mercury vapor generator, a turbine receiving vapor therefrom, a condenser-boiler that receives the exhaust from the turbine and generates steam, a means receiving steam from the boiler, and a heating device which assists the boiler and is subjected to flue gases of the generator after giving up a portion of their heat thereto.

20. In a power generating system, the combination of means for generating mercury vapor, a prime mover arranged to receive the vapor and convert a portion of its energy into mechanical work, means for condensing the vapor exhausting from the prime mover and producing a secondary vapor in a form available for use, and means for utilizing a part of the heat in the flue gases to add heat to the liquid mercury delivered to the generator.

21. In a power generating system, the combination of means for generating mercury vapor, a turbine arranged to receive the vapor and convert a portion of its energy into mechanical work, means for condensing the vapor exhausting from the turbine and generating a secondary vapor, an engine for converting a portion of the energy of the vapor into mechanical work, means for supplying feed water to said condensing means, and a means for utilizing a part of the residual heat in the flue gases after they leave the generator to heat the feed water.

22. In combination, a mercury vapor generator, a turbine driven by vapor therefrom, a condenser-boiler which condenses the exhaust from the turbine and generates steam under pressure available for use, an economizer to which mercury is fed by gravity from the condenser, and a heater for the feed water supplied to the steam boiler, said economizer and heater being acted upon by the flue gases from the generator.

23. In a power generating system, the combination of means for generating mercury vapor, a turbine arranged to receive the vapor and convert a portion of its energy into mechanical work, a condenser-boiler to which the turbine delivers its exhaust and which utilizes the latent heat of condensation to generate steam, a superheater for the steam that utilizes a part of the residual heat in the flue gases, and a means for heating the liquid mercury prior to its entrance into the generator which also utilizes a part of the heat in the flue gases.

24. In a power generating system, the combination of means for generating mercury vapor, a turbine arranged to receive the vapor and convert a portion of its energy into mechanical work, means for condensing the vapor exhausting from the turbine and producing a secondary vapor under pressure and available for use, means for utilizing a portion of the heat in the flue gases to add heat to the liquid mercury entering the generator, and means utilizing another portion of the heat in the flue gases to add heat to the steam system.

25. In a power generating system, the combination of means for generating mercury vapor, a turbine arranged to receive the vapor and convert a portion of its energy into mechanical work, means for condensing the vapor exhausting from the turbine and generating a secondary vapor, means for utilizing a portion of the heat in the flue gases for super-heating the steam delivered by the condensing boiler, and means for utilizing a portion of the heat in the flue gases for heating the feed water prior to its admission to the condenser-boiler.

26. In a system of the character described, the combination of a generator that receives a fluid having a high boiling point and generates low pressure vapor, a source of heat therefor, a turbine for utilizing the vapor, a condenser-boiler that condenses the exhaust of the turbine and generates high pressure vapor from a liquid having a relatively low boiling point, a heater that receives the liquid of condensation from the boiler and delivers it to the generator, a high pressure condensing turbine for utilizing the high pressure vapor, a super-heater interposed between the boiler and the high pressure turbine and through which the fire gases pass after leaving the heater, and an economizer for the liquid fed to the boiler and through which the fire gases pass after they leave the superheater.

27. In a system of the character described, the combination of a generator that receives a fluid having a high boiling point and vaporizes it, a source of heat therefor, means for utilizing the vapor, a condenser-boiler that condenses the vapor from said means and generates vapor from a liquid having a lower boiling point than the first named liquid, a heater that receives the liquid of condensation from the boiler and delivers it to the generator, means for utilizing the vapor from the boiler, a superheater interposed between the boiler and the last named means which is acted upon by the fire gases after they leave the heater, and an economizer for the liquid fed to the boiler which is acted upon by the gases after they leave the superheater.

28. The combination with a primary prime mover, of a secondary prime mover receiving energy from the heat of condensation of the primary prime mover, regulating means for each prime mover, and actuating means which cause the regulating means of the primary prime mover to open ahead of that of the secondary prime mover.

29. In a system of the character described, the combination of turbines, means for supplying the turbines with vapors from liquids having relatively high and low boiling points, the exhaust vapor from the turbine utilizing the fluid of high boiling point serving to vaporize the liquid having the lower boiling point, valve means for the turbines, and means for actuating the valve means arranged to open the valve means of the turbine utilizing the vapor from the fluid of high boiling point in advance of the other.

30. In combination, a vapor generator to which a fluid having a high boiling point is supplied, a turbine receiving vapor from the generator, a condenser-boiler containing a fluid having a lower boiling point than that supplied to the generator, which condenses the vapor from the turbine, generates vapor and returns condensed fluid to the generator, a turbine which receives vapor from the condenser-boiler, and governing means for the turbines which is so arranged that the admission of vapor to the first turbine is cut off later than the admission of vapor to the second turbine.

31. The combination of a mercury vapor generator whose pressure is substantially that of the atmosphere, a turbine driven by the vapor therefrom, a means heated by the mercury vapor exhausting from the turbine which generates relatively high pressure steam, a turbine driven by the high pressure steam, a means to prevent the pressure of the mercury vapor from rising above a predetermined pressure, and a governing mechanism for the turbine which imposes on the steam turbine the major portions of the load variations.

32. The combination of a mercury vapor generator, a mercury vapor turbine, a condenser-boiler which condenses the vapor from the turbine, generates steam and returns mercury to the generator, a valve which by-passes mercury vapor when the pressure in its generator rises above the desired value, a steam turbine receiving steam from the boiler, and governing means for the turbines which are so arranged that the admission of mercury vapor is cut off later than the admission of steam.

33. In combination, a mercury turbine and a steam turbine arranged to drive a common load, a valve means for each turbine which controls the admission of vapor thereto, a valve which automatically by-passes vapor around the mercury turbine when the pressure exceeds a predetermined value, and actuating means which causes the valve means on the mercury turbine to open ahead of that of the steam turbine.

34. In combination, turbines which operate with vapors derived from fluids having different boiling points, a valve means for each turbine which controls the admission of vapor thereto, a valve which automatically by-passes vapor around one of the turbines when the pressure exceeds a predetermined value, and actuating means which causes the valve means on one turbine to open ahead of that of the other turbine.

35. The combination of a generator for generating low pressure vapor from a liquid having a high boiling point, a low pressure turbine that receives and is driven by said vapor, a condenser-boiler that receives and condenses the exhaust vapor of said turbine and also generates high pressure steam, a valve controlled by-pass for automatically by-passing vapor from the admission side of the turbine to the condenser-boiler when the pressure rises above a predetermined amount, a high pressure engine driven by steam from the condenser boiler, an exhaust conduit therefor, means including a liquid heater for returning the condensed liquid from the condenser-boiler to the vapor generator, and governing mechanism for the turbine and engine.

36. In a power generating system the combination of a mercury vapor generator, a prime mover arranged to receive the vapor and convert a portion of its energy into mechanical work, a condenser for the prime mover located above the generator, and means for feeding liquid mercury from the condenser to the generator by gravity.

37. The combination of a mercury vapor generator, a turbine receiving the vapor therefrom, a condenser for the turbine located above the generator, and conduit means connecting the condenser and generator through which liquid mercury flows by gravity from the condenser to the generator.

38. In combination, a mercury vapor generator, a turbine driven by the vapor therefrom, a condenser receiving the exhaust from the turbine, an economizer for the liquid mercury located below the condenser and heated by the flue gases after they pass through the generator and to which liquid mercury is fed by gravity from the condenser, and a conduit connecting the economizer with the generator.

39. In combination, a mercury vapor generator, a turbine driven by the vapor therefrom, a condenser receiving the exhaust from the turbine, an economizer for the liquid mercury located below the condenser and heated by the flue gases and to which liquid mercury is fed by gravity from the condenser, and a conduit connecting the economizer with the generator.

40. The combination of a mercury vapor generator, a turbine receiving the vapor therefrom, a condenser for the turbine located above the generator, and conduit means connecting the condenser and generator, through which liquid mercury is free to flow to the generator, said conduit means containing a sufficient body of liquid to prevent vapor from the generator passing directly to the condenser.

41. The combination of a mercury vapor generator, a turbine receiving the vapor therefrom, a condenser-boiler for condensing the mercury vapor and generating steam, a means for returning condensed mercury to the generator, and a by-pass for by-passing excess mercury vapor around the mercury turbine to the condenser-boiler.

42. The combination of a mercury vapor generator, a turbine driven by the vapor, a conduit connecting the generator and turbine, a condenser for the turbine, controlling valve means between the generator and turbine responsive to speed variations of the turbine, a by-pass which connects the generator directly to the condenser, and a pressure actuated relief valve in the by-pass.

43. The combination, of a generator adapted to produce vapor from a fluid having a high boiling point, a source of heat, a conduit means for carrying off the waste products of combustion, and a pressure responsive valve for the generator which when opened discharges vapor into the conduit means.

44. The combination, of a generator adapted to produce vapor from a fluid having a high boiling point, a source of heat, a conduit means for carrying off the products of combustion, a pressure responsive valve for the generator which when opened discharges vapor into the conduit means, and a means for collecting the fluid which escapes from the generator when the valve opens and is condensed in passing through the conduit.

45. The combination, of a generator adapted to produce vapor from a fluid having a high boiling point, a source of heat, an apparatus for absorbing heat from the gases after they act on the generator, a conduit for conveying the exhaust gases from said apparatus to the point of final discharge, and a valve which opens in response to pressure variations in the generator and discharges vapor into a region in the conduit between said apparatus and the point of final discharge.

46. In a power generating system, the combination of a mercury vapor generator, a turbine driven thereby, means for condensing the exhaust vapor from the turbine and generating a vapor in a condition available for use, a condenser for the last named vapor, and a pump which is common to said condensing means and condenser for removing air and uncondensed gases therefrom.

47. The combination of a mercury vapor generator, a turbine receiving the vapor therefrom, a condenser-boiler which contains a fluid having a lower boiling point than mercury for condensing the mercury vapor and generating a vapor, a turbine which receives vapor from the condenser-boiler, a condenser for the second turbine, a cooler that is in communication with the condenser-boiler and the condenser, and an air pump that is connected to the cooler for extracting air and uncondensed gases therefrom.

48. The combination of a mercury vapor generator, a turbine receiving the vapor therefrom, a condenser-boiler which contains a fluid having a lower boiling point than mercury for condensing the mercury vapor and generating a vapor, a turbine which receives vapor from the condenser-boiler, a condenser for the second turbine, and an air pump that is common to both the condenser-boiler and condenser for extracting air and uncondensed gases therefrom.

In witness whereof, I have hereunto set my hand this 27th day of November, 1915.

WILLIAM L. R. EMMET.

Correction in Letters Patent No. 1,167,158.

It is hereby certified that in Letters Patent No. 1,167,158, granted January 4, 1916, upon the application of William L. R. Emmet, of Schenectady, New York, for an improvement in "Methods of and Apparatus for Generating Power," an error appears in the printed specification requiring correction as follows: Page 10, line 118, claim 18, for the word "form" read *from;* and that the said Letters Patent should be read with this correction therein that the same may conform to the record of the case in the Patent Office.

Signed and sealed this 1st day of February, A. D., 1916.

[SEAL.]

J. T. NEWTON,

*Acting Commissioner of Patents.*

Cl. 60–4